(12) United States Patent
Alvarez et al.

(10) Patent No.: US 9,242,727 B1
(45) Date of Patent: Jan. 26, 2016

(54) AUTOROTATION INITIATION AND FLARE CUES SYSTEM AND RELATED METHOD

(71) Applicants: Jorge A. Alvarez, Cedar Rapids, IA (US); Brian E. Mishmash, Atkins, IA (US); Stephen D. Kropp, Albuquerque, NM (US)

(72) Inventors: Jorge A. Alvarez, Cedar Rapids, IA (US); Brian E. Mishmash, Atkins, IA (US); Stephen D. Kropp, Albuquerque, NM (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/492,608

(22) Filed: Sep. 22, 2014

(51) Int. Cl.
 *B64C 27/04* (2006.01)
 *B64C 27/00* (2006.01)
 *B64D 45/00* (2006.01)

(52) U.S. Cl.
 CPC ............... *B64C 27/006* (2013.01); *B64C 27/04* (2013.01); *B64D 45/00* (2013.01)

(58) Field of Classification Search
 USPC ........................................................ 244/17.13
 See application file for complete search history.

(56) References Cited

U.S. PATENT DOCUMENTS

| 3,142,455 | A | * | 7/1964 | Wilford | B64C 29/02 244/7 B |
| 4,695,013 | A | * | 9/1987 | Trampnau | B64C 27/006 244/17.13 |
| 5,415,549 | A | * | 5/1995 | Logg | A63F 13/005 345/589 |
| 7,976,310 | B2 | * | 7/2011 | Bachelder | G05D 1/0072 434/33 |
| 2004/0093130 | A1 | * | 5/2004 | Osder | B64C 27/18 701/3 |
| 2004/0232280 | A1 | * | 11/2004 | Carter et al. | B64C 27/52 244/17.25 |
| 2007/0164167 | A1 | * | 7/2007 | Bachelder | G05D 1/102 244/220 |
| 2012/0168556 | A1 | * | 7/2012 | Sonneborn | B64C 27/025 244/17.23 |
| 2012/0168568 | A1 | * | 7/2012 | Sonneborn | B64C 27/26 244/7 R |
| 2012/0286088 | A1 | * | 11/2012 | Mercer | B64C 27/57 244/17.13 |
| 2013/0221153 | A1 | * | 8/2013 | Worsham, II | B64C 27/006 244/17.13 |
| 2014/0263820 | A1 | * | 9/2014 | Smith | B64C 27/006 244/17.13 |

FOREIGN PATENT DOCUMENTS

DE 3434758 A1 * 4/1986 ............ B64C 27/006

* cited by examiner

*Primary Examiner* — Shelley Chen
(74) *Attorney, Agent, or Firm* — Angel Gerdzhikov; Donna Suchy; Daniel Barbieri

(57) ABSTRACT

Embodiments of the inventive concepts disclosed herein may provide visual and audible flight direction cues to the pilot of a helicopter to maintain an optimum energy sustaining profile to successfully perform an autorotation maneuver. From the moment the engine fails or fails to provide adequate power to the main rotor system, systems described herein provide airspeed, attitude, and altitude guidance to the pilot to intercept and fly the correct path for a successful autorotation entry and autorotation descent. The system displays specific cues as the helicopter approaches the determined flare altitude and guides the pilot through the autorotation flare and minimum rate of descent touchdown.

20 Claims, 8 Drawing Sheets

AUTOROTATION INITIATION AND FLARE CUES SYSTEM AND RELATED METHOD

FIELD OF THE INVENTION

Embodiments of the inventive concepts disclosed herein relate generally to flight direction for a helicopter pilot to successfully land an engine out aircraft. More particularly, embodiments disclosed herein relate to a system and related method for providing visual and audible flight direction cues to a pilot of a helicopter during an autorotation.

BACKGROUND

Helicopter energy management is of primary concern during an engine out situation onboard a helicopter. Energy may be found within each of the rotating components including the kinetic energy stored in the rotor system. This energy may be used to counteract the rate of descent during an autorotation landing by converting the kinetic energy in the rotor system into Lift. Additional Lift is produced at the bottom of an autorotation by increasing the angle of attack of the main rotor blades. During the autorotation procedure, rotor RPM will rapidly decay. It is essential to properly time the autorotation flare by converting the rotor RPM energy into Lift to fully arrest the descent and cushion the landing.

Traditional flight director systems may offer guidance to a ground based navigational aid including an instrument landing system (ILS) or area navigation (RNAV) lateral and vertical guidance profiles. These systems, however, offer guidance to a specific point on the surface and fail to incorporate local atmospherics into the guidance equation. For example, and ILS may provide ground based guidance to a specific landing point on a runway. Similarly, RNAV systems may offer inertial or satellite based guidance to a specific point on a runway. These systems have no value during an engine out autorotation maneuver.

Proper autorotation technique is of primary concern, since the pilot has a single opportunity for success. Pilot visual scan should be appropriate for the phase of the autorotation to be successful. As the pilot turns the helicopter to final landing heading or course line prior to the flare, pilot scan should focus almost entirely outside. The successful scan should include: 1) Outside—to the horizon for attitude, ground track, and nose alignment; 2) Down—for altitude to set the flare and for closure vertical speed and groundspeed; and 3) Inside the cockpit—to cross-check airspeed, rotor rpm, and engine rpm in the descent.

The completion maneuver just before the helicopter touches down may be referred to as the autorotational flare. Each autorotational flare may be unique depending on the existing wind conditions, airspeed, Density Altitude (DA), and the aircraft gross weight. These many variables could lead to pilot misinterpretation of existing conditions and an unsuccessful autorotation. Therefore, a need remains for a system and related method to aid a pilot in recognition of these variables and offer cues to mitigate factors which could lead to an unsuccessful autorotation.

SUMMARY

Accordingly, one embodiment of the inventive concepts disclosed herein may include a system for displaying autorotation cues to a helicopter pilot. The system may comprise a storage device configured for storing at least static information, the static information including: terrain data associated with a geographic area; and helicopter specific data associated with a helicopter. The system may include a controller operatively coupled with the storage device, the controller having an autorotation cue processor and an autorotation cue generator.

The storage device may also include non-transitory computer readable program code embodied therein for determining autorotation cues, the computer readable program code comprising instructions which, when executed by the autorotation cue processor, cause the autorotation processor to perform and direct specific steps. Some of these steps may include monitoring a plurality of ambient parameters and monitoring a plurality of helicopter parameters.

The controller may compare comparing one of the plurality of helicopter parameters to a desired helicopter parameter and should the controller detect a loss of power based on the comparing, it will take specific action. During normal operation, the controller is continuously monitoring and continuously determining a target autorotation airspeed based on the static information and the plurality of ambient parameters. The controller is also continuously determining an autorotation attitude based on the target autorotation airspeed and the helicopter parameters and an autorotation flare altitude based on the target autorotation airspeed, the plurality of ambient parameters, and the plurality of helicopter parameters.

With these determined parameters ready, the controller also accesses the computer readable program code to generate an autorotation attitude cue based on the autorotation attitude, an autorotation airspeed cue based on the target autorotation airspeed; and an autorotation flare cue based on the autorotation altitude, the autorotation flare cue including at least one of: a visual cue and an audible cue.

As the system continuously generates these autorotation cues, the controller waits for a loss of power. Should the controller determine a loss of power, it may display, on a flight display operatively coupled with the controller, the autorotation airspeed cue, the autorotation attitude cue, and the autorotation altitude display. These displayed parameters may aid the helicopter pilot in recognition and entry into the autorotation maneuver. Then, once the helicopter is within a predetermined range of the autorotation flare altitude, the controller may present the autorotation flare cue on the flight display an on an audible warning device.

An additional embodiment of the inventive concepts disclosed herein may include a system wherein the terrain data associated with a geographic area includes one of: a digital terrain database, a raster terrain database, and a vector terrain database.

An additional embodiment of the inventive concepts disclosed herein may include a system wherein the helicopter specific data associated with the helicopter includes at least one of: a helicopter type, autorotation airspeed, an autorotation profile, data associated with a height velocity profile for the helicopter, and an average helicopter weight.

An additional embodiment of the inventive concepts disclosed herein may include a system wherein the plurality of ambient parameters further includes at least one of an ambient wind vector, density altitude, and an ambient temperature.

An additional embodiment of the inventive concepts disclosed herein may include a system wherein the plurality of helicopter parameters further includes at least one of: a yaw rate, an attitude, an airspeed, and a heading.

An additional embodiment of the inventive concepts disclosed herein may include a system wherein the at least one desired helicopter parameter includes: an engine torque, a power level of the engine, an engine rounds per minute speed, a current main rotor blade angle, a tail rotor speed, a rudder deflection, and an ability of the engine to drive a helicopter main rotor.

An additional embodiment of the inventive concepts disclosed herein may include a system wherein the autorotation airspeed cue is displayed associated with an airspeed indicator on the flight display onboard the helicopter.

An additional embodiment of the inventive concepts disclosed herein may include a system wherein a crew alerting system is configured for providing the audible cue.

An additional embodiment of the inventive concepts disclosed herein may include a system wherein the autorotation flare cue is associated with an altitude indicator on the flight display onboard the helicopter.

An additional embodiment of the inventive concepts disclosed herein may include a system wherein the autorotation altitude is centrally displayed on at least one of: the flight display and a heads up display for enhanced helicopter pilot awareness.

An additional embodiment of the inventive concepts disclosed herein may include a method for displaying autorotation cues to a helicopter pilot. The method may comprise accessing static information, the static information including terrain data associated with a geographic area and helicopter specific data associated with a helicopter. The method may include monitoring a plurality of ambient parameters and a plurality of helicopter parameters.

The method may include comparing one of the plurality of helicopter parameters to a desired helicopter parameter. As a result of the comparing, the method may determine a loss of power to the helicopter based on the comparing.

The method may continuously determine a target autorotation airspeed based on the static information and the plurality of ambient parameters and continuously generate and update an autorotation airspeed cue based on the target autorotation airspeed. The method may also continuously determine an autorotation attitude based on the target autorotation airspeed and at least one of the plurality of helicopter parameters and generate and continuously update an autorotation attitude cue based on the autorotation attitude.

The method may also determine an autorotation flare altitude based on the target autorotation airspeed, the plurality of ambient parameters, and the plurality of helicopter parameters and generate an autorotation flare altitude display based on the autorotation flare altitude. The method may also generate an autorotation flare cue based on the autorotation flare altitude, the autorotation flare cue may indicate one of: a visual cue and an audible cue.

Should the method determine a loss of power, it may display 1) the autorotation airspeed cue, 2) the autorotation attitude cue and 3) the autorotation flare altitude display to a helicopter pilot on a flight display. The pilot may fly with reference to these cues during the autorotation maneuver. Then, should ambient parameters be nonlinear in the descent, the method may determine a range associated with the autorotation flare altitude based on at least one of the plurality of ambient parameters and present the autorotation flare cue on the flight display and on an audible warning device when the monitoring indicates an above ground level altitude within the range.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the inventive concepts disclosed herein may be better understood by those skilled in the art by reference to the accompanying figures in which.

DETAILED DESCRIPTION

Reference will now be made in detail to the presently preferred embodiments of the invention, examples of which are illustrated in the accompanying drawings. The following description presents certain specific embodiments of the inventive concepts disclosed herein. However, the inventive concepts disclosed herein may be embodied in a multitude of different ways as defined and covered by the claims. In this description, reference is made to the drawings wherein like parts are designated with like numerals throughout.

Embodiments of the inventive concepts disclosed herein may provide visual and audible flight direction cues to the pilot of a helicopter to maintain an optimum energy sustaining profile to successfully perform an autorotation maneuver. From the moment the engine fails, systems described herein provide airspeed, attitude, and elevation guidance to the pilot to intercept and fly the correct path for a successful autorotation entry, autorotation descent, autorotation flare, and minimum rate of descent touchdown.

Although a helicopter is generally disclosed as one platform on which embodiments of the inventive concepts disclosed herein may be deployed, various rotorcraft and hovercraft may benefit from embodiments here. The concept of autorotation guidance may remain consistent throughout each of the various rotorcraft platforms.

| Reference Chart | |
|---|---|
| Ref. No. | Description |
| 100 | Path Diagram |
| 102 | Terrain Level |

-continued

Reference Chart

| Ref. No. | Description |
| --- | --- |
| 104 | Above Ground Level (AGL) |
| 106 | Engine Failure Point |
| 108 | Autorotation Flare Altitude |
| 110 | Helicopter |
| 118 | Predetermined Range |
| 120 | Autorotation Path |
| 122 | Recognition |
| 124 | Energy Sustaining Autorotation Path |
| 126 | Autorotation Flare Maneuver |
| 128 | Touchdown Phase |
| 200 | Altitude Velocity Diagram |
| 202 | Low Speed Unsafe Flight Regimes |
| 204 | High Speed Unsafe Flight Regimes |
| 210 | First Point |
| 212 | Second Point |
| 300 | System 300 |
| 302 | Plurality of Inputs |
| 310 | Controller |
| 312 | Autorotation Cue Processor |
| 314 | Cue Generator |
| 316 | Altitude Attitude Airspeed Cues |
| 318 | CAS Message |
| 320 | Flight Display |
| 322 | Crew Alert System |
| 324 | Speaker |
| 330 | Storage |
| 400 | Recognition |
| 410 | Autorotation Airspeed Cue |
| 420 | Autorotation Flare Altitude Display |
| 430 | Autorotation Flare Cue |
| 440 | Autorotation Attitude Cue |
| 500 | Autorotation |
| 600 | Flare |
| 700 | Touchdown |
| 800 | Flowchart |

Figure 1:
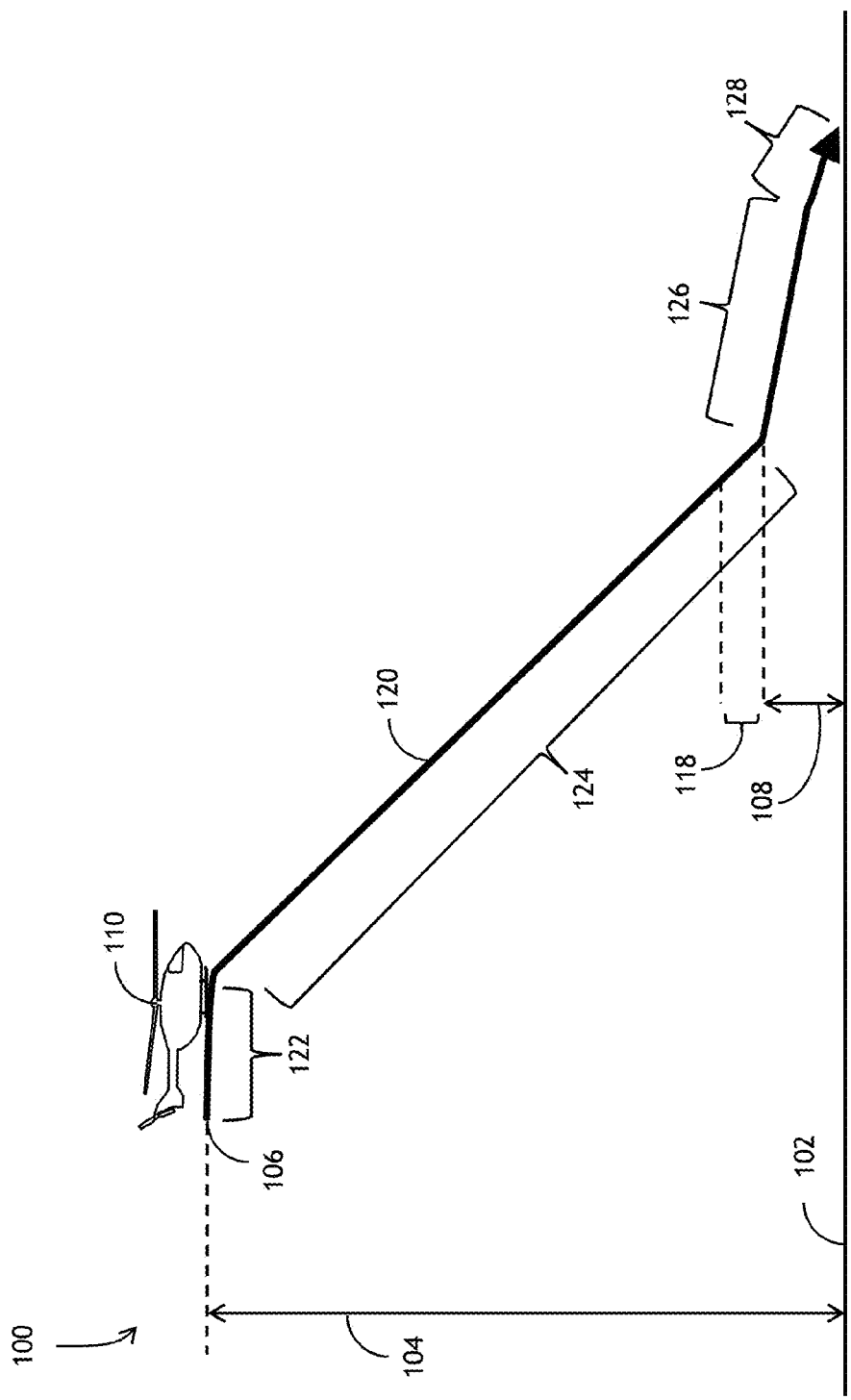
FIG. 1 is a diagram of an exemplary path of an autorotation guided by one embodiment of the inventive concepts disclosed herein.

Referring to FIG. 1, a diagram of an exemplary path of an autorotation guided by one embodiment of the inventive concepts disclosed herein is shown. Diagram 100 may indicate a helicopter 110 which may fly at an altitude above ground level (AGL) 104 which may also be indicated as a reference altitude above mean sea level (MSL). Terrain level 102 above which the helicopter 110 may fly is one factor in determining the energy available to the helicopter 110 to perform a successful autorotation. An autorotation path 120 for successful autorotation may include an engine failure point 106, a recognition 122, a rotor energy sustaining autorotation path 124, a flare maneuver 126, and a touchdown phase 128.

The engine failure point 106 may include a point at which engine RPM decreases below a specific threshold as well as a complete engine failure or seizure where engine RPM approaches zero. The engine failure point 106 may also include a point at which the engine is no longer able to maintain sufficient torque for the helicopter to maintain the altitude AGL 104.

The recognition 122 of the requirement to perform an autorotation maneuver may include system recognition as well as pilot recognition. System recognition of an engine failure may include an engine monitoring device coupled to, for example, an engine compressor speed (N1) of one or more engines. Additionally, the recognition 122 may include pilot recognition of a power failure and pilot initiation of the autorotation maneuver.

The rotor energy sustaining autorotation path 124 may be designed to minimize energy loss within the rotor system while maintaining a continuous rate of descent. For example, at a specific aircraft weight and ambient density altitude, the rotor energy sustaining autorotation path 124 has a specific slope. This slope may include a target airspeed and a target pitch to be flown by the pilot. During the rotor energy sustaining autorotation path 124, one goal may include maximizing the energy retained in the rotor system for the follow on autorotation flare maneuver 126.

The autorotation flare maneuver 126 may include a transition from the energy sustaining autorotation 124 where the pitch of the rotor blades is changed to arrest the rate of descent. The autorotation flare maneuver 126 may begin at the autorotation flare altitude 108. In some embodiments, the autorotation flare altitude 108 may include a predetermined range 118 associated with the autorotation flare altitude 108 at which the autorotation flare maneuver 126 should be initiated. This transition may use the energy retained by the rotor system during the autorotation 124 to both 1) break the rate of descent and 2) reduce airspeed to discontinue forward motion of the helicopter 110.

The touchdown phase 128 may include the path after the flare as the pilot transitions from an energy depleting flare to an energy depleting touchdown. In the touchdown phase 128 the remaining energy stored in the rotation of the rotor system is used to further break the rate of descent and perform a touchdown at a minimum rate of descent to maintain aircraft structural integrity.

Figure 2:
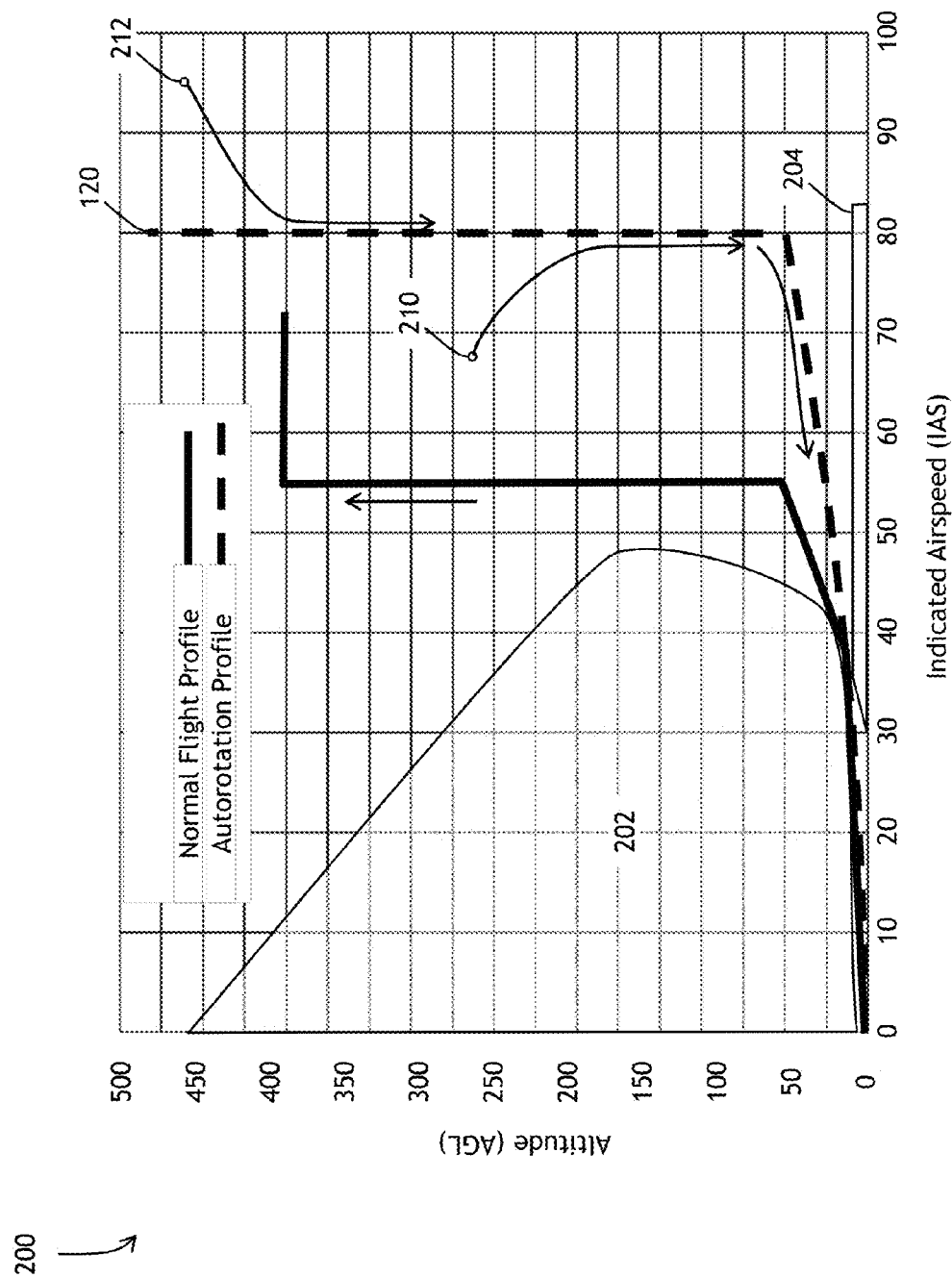
FIG. 2 is a graph of an exemplary height-velocity diagram within which embodiments of the inventive concepts disclosed herein may guide a helicopter pilot.

Referring to FIG. 2, a graph of an exemplary height-velocity diagram within which embodiments of the inventive concepts disclosed herein may guide a helicopter pilot is shown. Within a height velocity curve, there are specific unsafe flight regimes where autorotation success is unlikely. Generally these unsafe flight regimes are at low altitude and at slow airspeeds 202 but may also include low altitude and high airspeeds 204. Each height velocity curve 200 may be specific to each helicopter 110 type and may be incorporated within an aircraft flight manual offering flight regime guidance to a pilot.

Systems herein may guide the pilot from positions outside the unsafe flight regimes 202 and 204 to the autorotation path 120 to complete a successful autorotation and landing. For example, should the helicopter 110 lose power at a first point 210 at 260 feet AGL and 68 Knots Indicated Airspeed (KIAS) (IAS), systems herein may operate to guide the pilot each point of a flight regime to fly the autorotation path 120. From the first point 210 the system may guide the pilot to increase airspeed to the desired 80 KIAS to comply with the autorotation path 120. Similarly from second point 212 at 460 feet AGL and 90 KIAS, embodiments of the inventive concepts herein may operate to display guidance cues to the pilot to decelerate to 80 KIAS and fly from the second point 212 to the autorotation path 120. Here, the exemplary autorotation path 120 includes a constant descent at 80 knots KIAS to an autorotation flare at 50 feet AGL.

Figure 3:
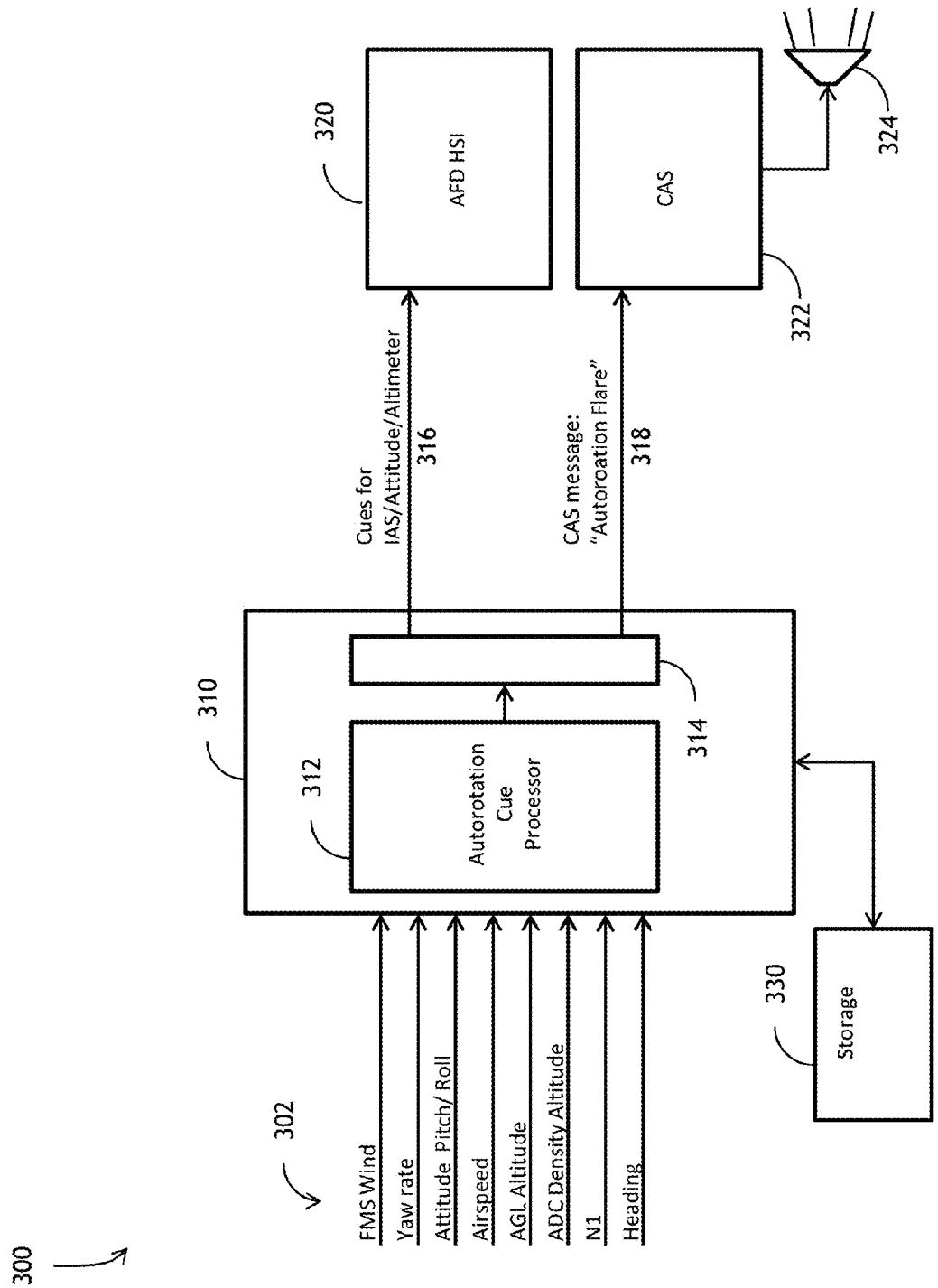
FIG. 3 is a diagram of a system for autorotation initiation and flare cues exemplary of an embodiment of the inventive concepts disclosed herein.

Referring to FIG. 3, a diagram of a system 300 for autorotation initiation and flare cues exemplary of an embodiment of the inventive concepts disclosed herein is shown. The system 300 may include a controller 310 configured for controlling each aspect of the methods system 300 may carry out to determine and display autorotation cues to the pilot. Within the controller 310, autorotation cue processor 312 may operate to receive a plurality of inputs 302, determine which cues are presented, and where the cues may be presented on a flight display 320 and within a Cockpit Alerting System (CAS) 322.

Plurality of inputs 302 may include a nonexclusive list of:
1) Wind data, including an input from a wind source associated with a Flight Management System (FMS);
2) Yaw rate from a plurality of sources including onboard Inertial Navigation Systems (INS) as well as gyroscopic systems including those systems operating to supply gyroscopic information to the pilot of the helicopter;

3) Attitude of the helicopter including instantaneous pitch as well as pitch rate and angle of bank including instantaneous angle of bank as well as roll rate;
4) Airspeed from a pitot static system as well as from a global navigation satellite system (GNSS);
5) AGL altitude from a radio altimeter as well as from a GNSS system;
6) Air Data information based on ambient conditions and available from an onboard Air Data Computer (ADC) including density altitude;
7) Engine Rounds Per Minute (RPM) as measured from at least one of the helicopter engines—here, N1 may be a desirable source of information for system 300 to measure as a metric of current engine operational performance; and
8) Heading available from a compass system as well as from a GNSS and INS systems.

Storage 330 may maintain specific information associated with the helicopter on which the system 300 is deployed. In some embodiments, the storage 330 may operate to store static information available to the system 300 to aid in creating the display cues. Specific information may include an average weight, an autorotation design speed, additional parameters available within the flight manual and pilot operating handbook for the helicopter, and any of the plurality of inputs 302.

Of note, these sources of data are listed as exemplary only and serve not to limit the scope of the inventive concepts herein, but to exemplify the plurality of input sources available for the system 300 use. The controller 310 may receive and monitor the plurality of inputs 302 and command autorotation logic to analyze the plurality of inputs for appropriate cues to be presented to the pilot.

The storage 330 may be configured to store terrain data including details of the terrain over which a helicopter may fly. Terrain data may provide one input to the system 300 to determine a type of topography available for the helicopter pilot to land. Some exemplary types of terrain data suitable for use by the system 300 may include a data in a Raster formats including Digital Raster Graphics as well as Vector formats such as a Keyhole Markup Language (KML) based standard data. In addition, a Digital Terrain Elevation Data (DTED) format may be particularly suitable for embodiments of the inventive concepts disclosed here.

A cue generator 314 may operate to receive inputs from the autorotation cue processor 312 and generate the cues required for the system 300 to successfully guide the pilot to a safe autorotation. Cues for airspeed, attitude and altitude 316 may include visual cues available to a pilot on the flight display 320, while aural messages may be presented to the pilot via the CAS 322.

One such flight display 320 may include an adaptive flight display configured for a plurality of information available to the pilot providing an integrated display enhancing pilot situational awareness. Displays such as an Electronic Flight Instruments System (EFIS) and Engine Indication and Crew Alerting System (EICAS) may provide the system 300 requirement for sufficiently displaying the autorotation cues to the pilot.

Also, a heads up display (HUD) system may function as one flight display available to the pilot and within the scope of the system 300 to provide the helicopter pilot with the heads up situational awareness as well as the system 300 cues to enable the pilot to fly a successful autorotation.

Figure 4:
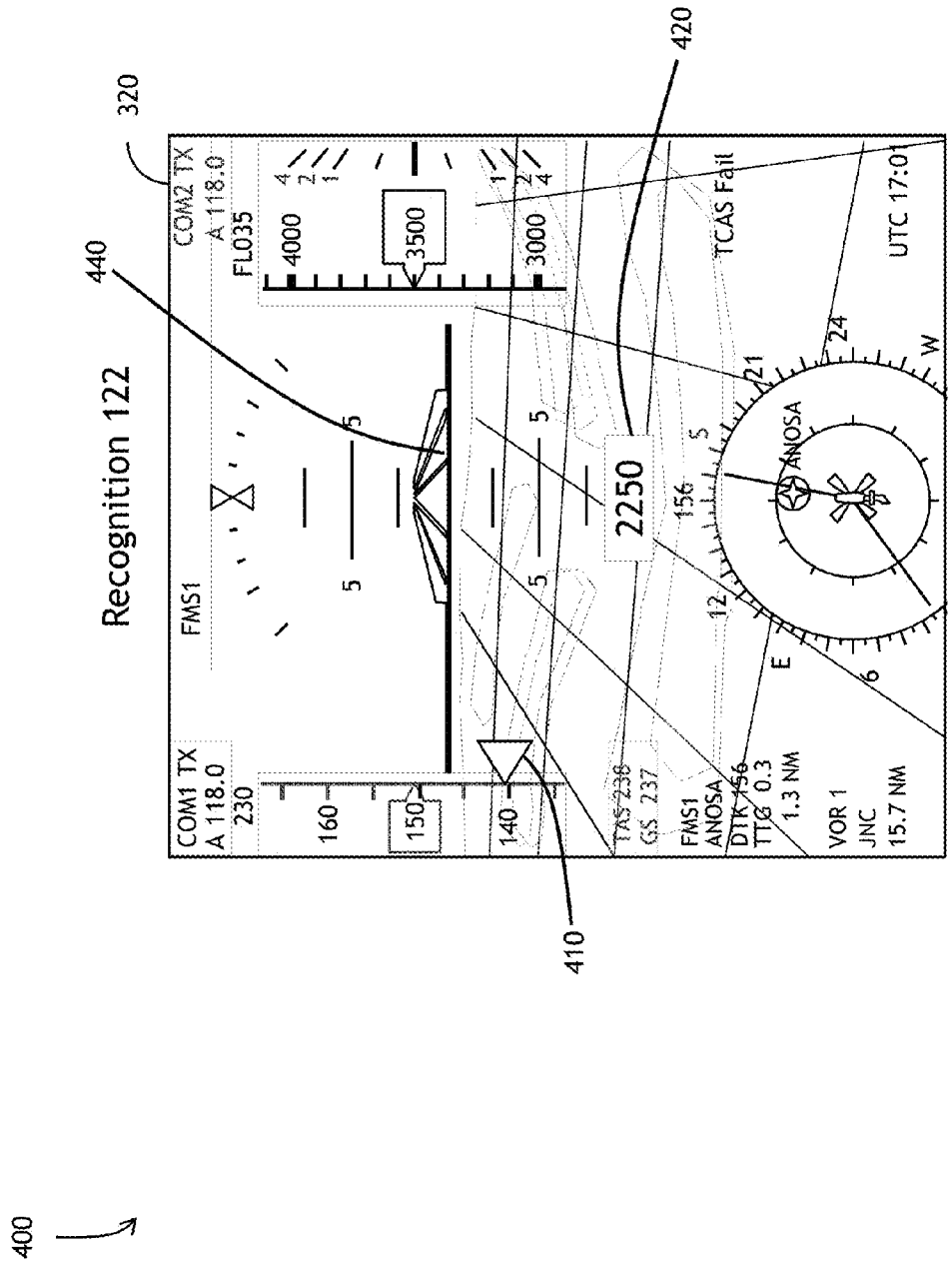
FIG. 4 is an diagram of a flight display at a point of engine failure recognition exemplary of one embodiment of the inventive concepts disclosed herein.

Referring to FIG. 4, a diagram of a flight display 320 at a point of engine failure recognition 122 exemplary of one embodiment of the inventive concepts disclosed herein is shown. The system 300 may continuously monitor the plurality of the inputs 302 to determine if an autorotation is warranted. In one example, a decrease in N1 may be a reliable indication that the engine is not able to sufficiently power the main rotor for level flight. The system 300 recognition 400 of an autorotation requirement may provide autorotation cues as an indicator to the pilot of a need for autorotation well before the pilot is able to perceive the requirement.

For example, a rapid decrease in N1 may be noticeable by the pilot whereas an insidious decrease in N1 may not. The system 300 may recognize this insidious decrease in N1 and alert the pilot via the display of autorotation cues.

An autorotation airspeed cue 410 may be indicated and associated with the airspeed indicator onboard the helicopter. The autorotation airspeed cue 410 may indicate a desired indicated airspeed for the pilot to accelerate or decelerate toward to intercept the autorotation path 120. Here, an exemplary AFD may indicate airspeed to the pilot on the left side of the display. In this manner, the system 300 may display the autorotation airspeed cue 410 proximal to the actual airspeed indicator. In some embodiments, the system 300 may display the autorotation airspeed cue 410 as a carat or "bug" on a circular dial type airspeed indicator.

With reference to pitch, the autorotation attitude cue 440 may indicate to the pilot the attitude to fly to achieve the desired IAS. In embodiments, the system 300 may direct the autorotation attitude cue to pitch the helicopter nose up or nose down to decelerate or accelerate to the desired IAS. For example, here the current IAS is 150 KIAS while the desired IAS is 140 KIAS. The system 300 may command a pitch up to decelerate the helicopter to achieve the desired 140 KIAS.

With reference to roll, the autorotation attitude cue 440 may indicate to the pilot a roll angle to achieve a target course line to fly to a desired landing area. In some cases, the terrain directly in front of the helicopter may be unsuitable for landing. The system 300, with reference to terrain data, may indicate a roll left or right to direct the pilot to the desired landing area.

An autorotation flare altitude display 420 may be prominently indicated to command a heightened awareness of the pilot. As the autorotation flare altitude 108 may be a vital parameter in a successful autorotation, the system 300 may display the autorotation flare altitude display 420 in the center of the flight display 320. Here, the autorotation flare altitude display 420 of 2250 MSL maintains reference to the currently displayed altitude (MSL) for the display in use. In some embodiments, the autorotation flare altitude display 420 may be displayed in AGL altitude where the AGL is displayed on the flight display 320.

Figure 5:
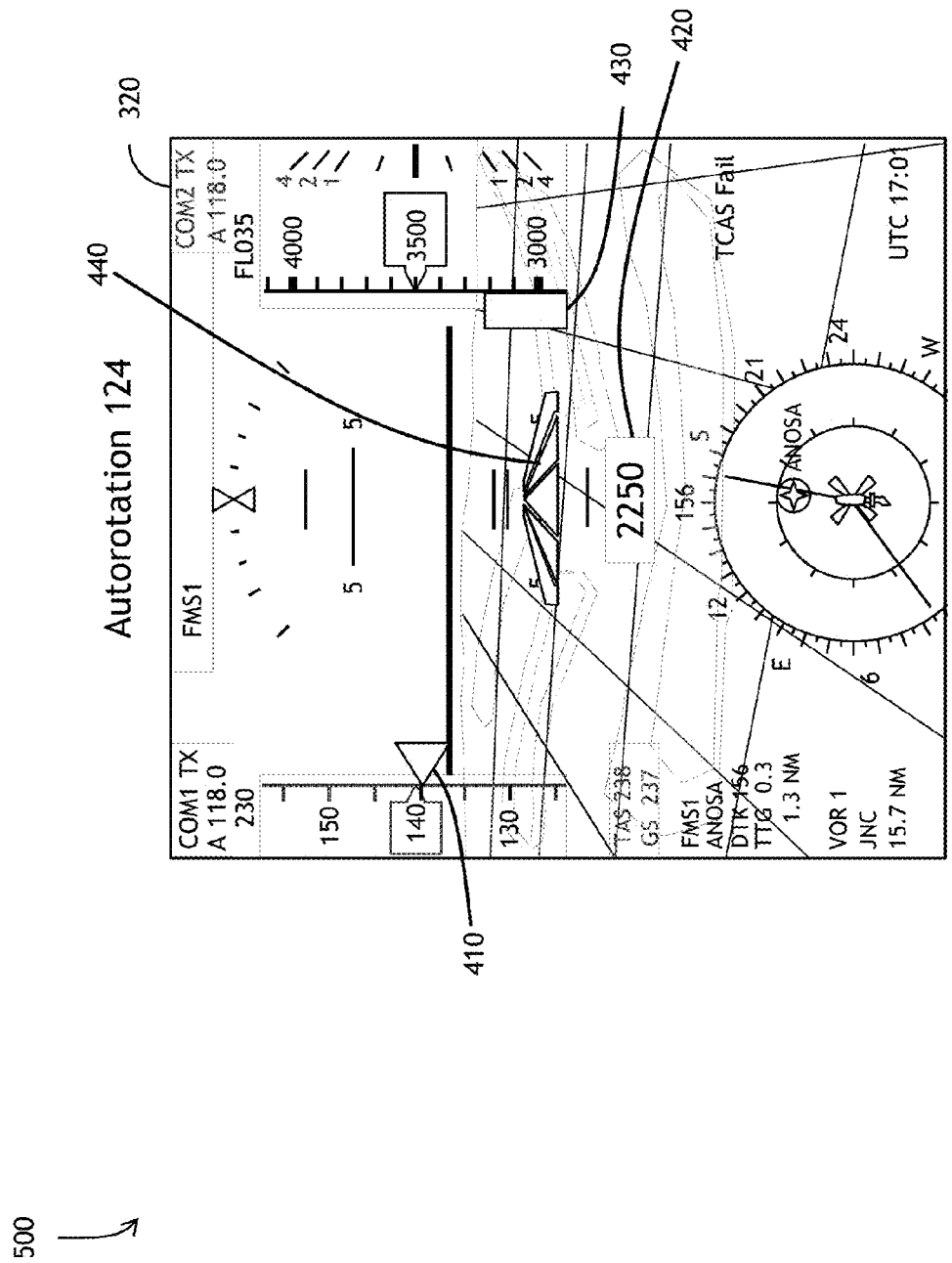
FIG. 5 is a diagram of a flight display at a point during autorotation exemplary of one embodiment of the inventive concepts disclosed herein.

Referring to FIG. 5, a diagram of a flight display at a point during autorotation exemplary of one embodiment of the inventive concepts disclosed herein is shown. Steady state autorotation 500 may operate as an energy sustaining maneuver to save the energy necessary for the autorotation flare. As the pilot decelerates to the desired airspeed of 140 KIAS, the autorotation airspeed cue 410 is displayed at that airspeed. In this manner, when the desired airspeed is reached, the pilot no longer must search and scan for a specific number in the airspeed window, all that is required of the pilot is to keep the autorotation airspeed cue 410 in the center (top to bottom) of the flight display 320 and the airspeed will remain within tolerance.

As the autorotation attitude cue 440 indicates the desired attitude for the pilot to maintain the desired airspeed on the autorotation path 120, the desired attitude may be indicated at a relatively nose low attitude. Here an exemplary five degrees nose low may function to maintain the desired airspeed.

While established on the autorotation path 120, and approaching the autorotation flare altitude 108, the system 300 begins to display the autorotation flare cue 430 to visually indicate to the pilot the time to flare is approaching. As with the autorotation airspeed cue 410, the autorotation flare cue 430 may not need to indicate a number to the pilot as the pilot attention must remain focused on both an outside as well as inside scan.

The autorotation flare cue 430 may be displayed in association with the altitude indicator as the pilot must scan altitude as well as be aware of the presence of the autorotation flare cue 420. In operation, the autorotation flare cue 430 may begin at the bottom of the display 320 and rise in associated with altitude as the helicopter descends.

Figure 6:
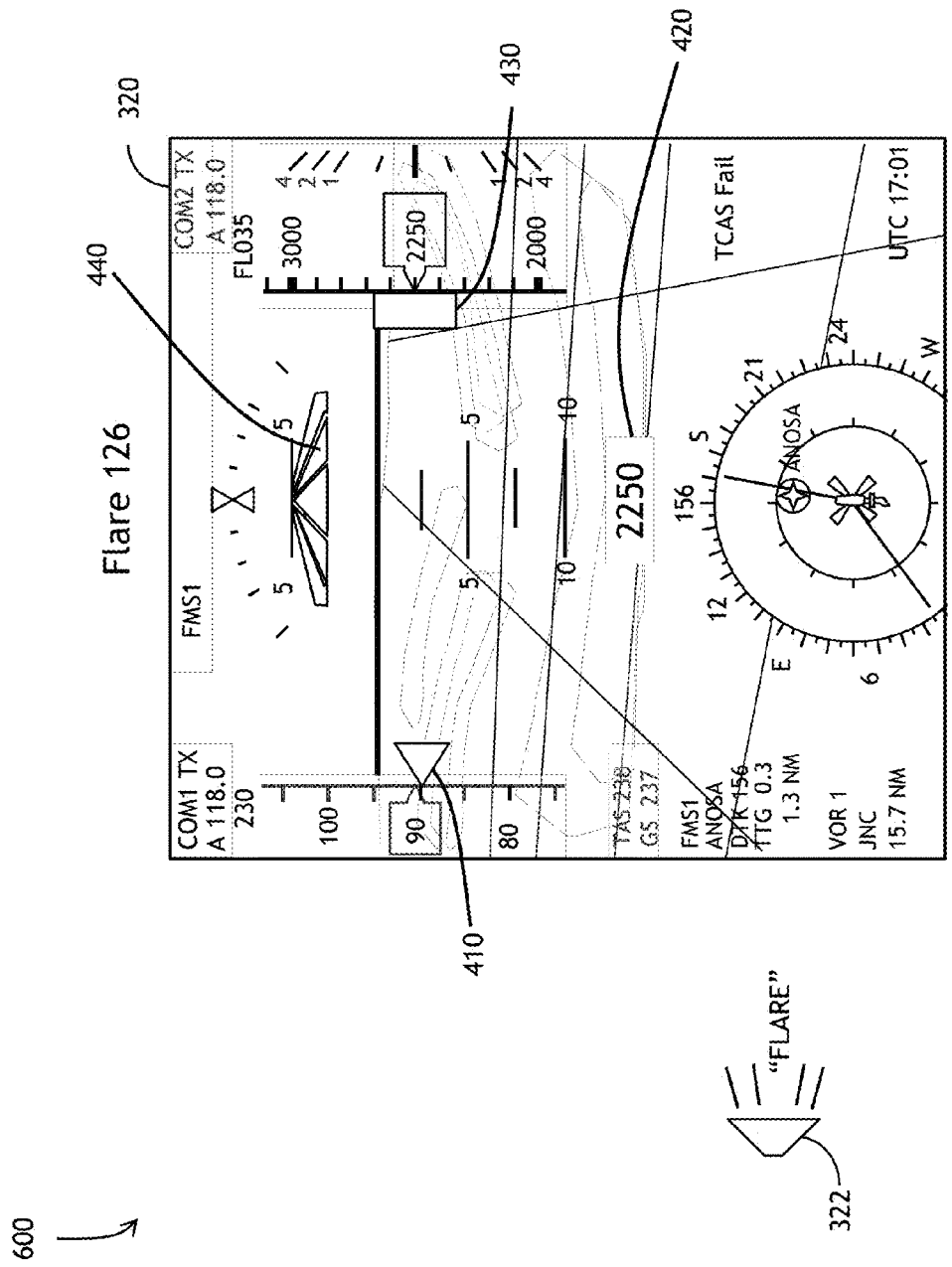
FIG. 6 is a diagram of a flight display at a point during autorotation flare exemplary of one embodiment of the inventive concepts disclosed herein.

Referring to FIG. 6, a diagram of a flight display 320 at a point during autorotation flare 126 exemplary of one embodiment of the inventive concepts disclosed herein is shown. The autorotation flare state 600 may be the point along the autorotation path 120 where the energy saved within the rotor system is used to break the rate of descent and forward airspeed. As the helicopter approaches the autorotation flare 126, the system 300 commands each of the autorotation attitude cue 440 and the autorotation flare cue 430 to indicate to the pilot the nose up attitude and altitude reached to accomplish the autorotation flare 126. In addition, CAS may command an audible "flare, flare, flare" command 322 for additional awareness for the pilot to begin the autorotation flare 126.

In some situations during specific autorotation maneuvers, it may be beneficial to the pilot for system 300 to present the audible flare command 322. For example, at night or in instrument conditions, the audible flare command 322 may aid the pilot in performance of the autorotation flare to promote a proper visual scan at the time of autorotation flare 126.

In some embodiments, system 300 may begin movement of the flare cues (the autorotation flare cue 430 and the autorotation attitude cue 440 within a predetermined range 118 of the autorotation flare altitude. Depending on ambient conditions, the system 300 may command a nose up attitude at a predetermined altitude above the autorotation flare altitude to "lead" the flare maneuver to prevent helicopter damage. For example, as the helicopter is descending on the autorotation path 120, the system 300 may receive an ambient temperature increase causing a higher density altitude and decreased performance in the flare maneuver. In this case where an ambient parameter may not linearly change with altitude, the system 300 may command the flare maneuver prior to the helicopter reaching the autorotation flare altitude 108.

Conversely, should ambient conditions enable increased performance as the helicopter descends on the autorotation path 120, the system 300 may begin to command the nose up attitude of the flare maneuver later than expected at a lower altitude than the flare altitude display. For example, with increasing performance measured in the descent, the system 300 may begin to move the autorotation flare cues 20 feet lower than the autorotation flare altitude display 420 may indicate.

In some embodiments, system 300 may configure the autorotation flare cues to communicate with an autopilot of the helicopter 110. Here, the system 300 may offer a coupled autorotation maneuver for the pilot of the helicopter to select. For example, system 300 may send autorotation flare inputs to a flight management system onboard the autopilot equipped helicopter. In this manner, the pilot may couple the autopilot to the flight manage system enable the autopilot to fly the autorotation maneuver and autorotation flare maneuver.

Figure 7:
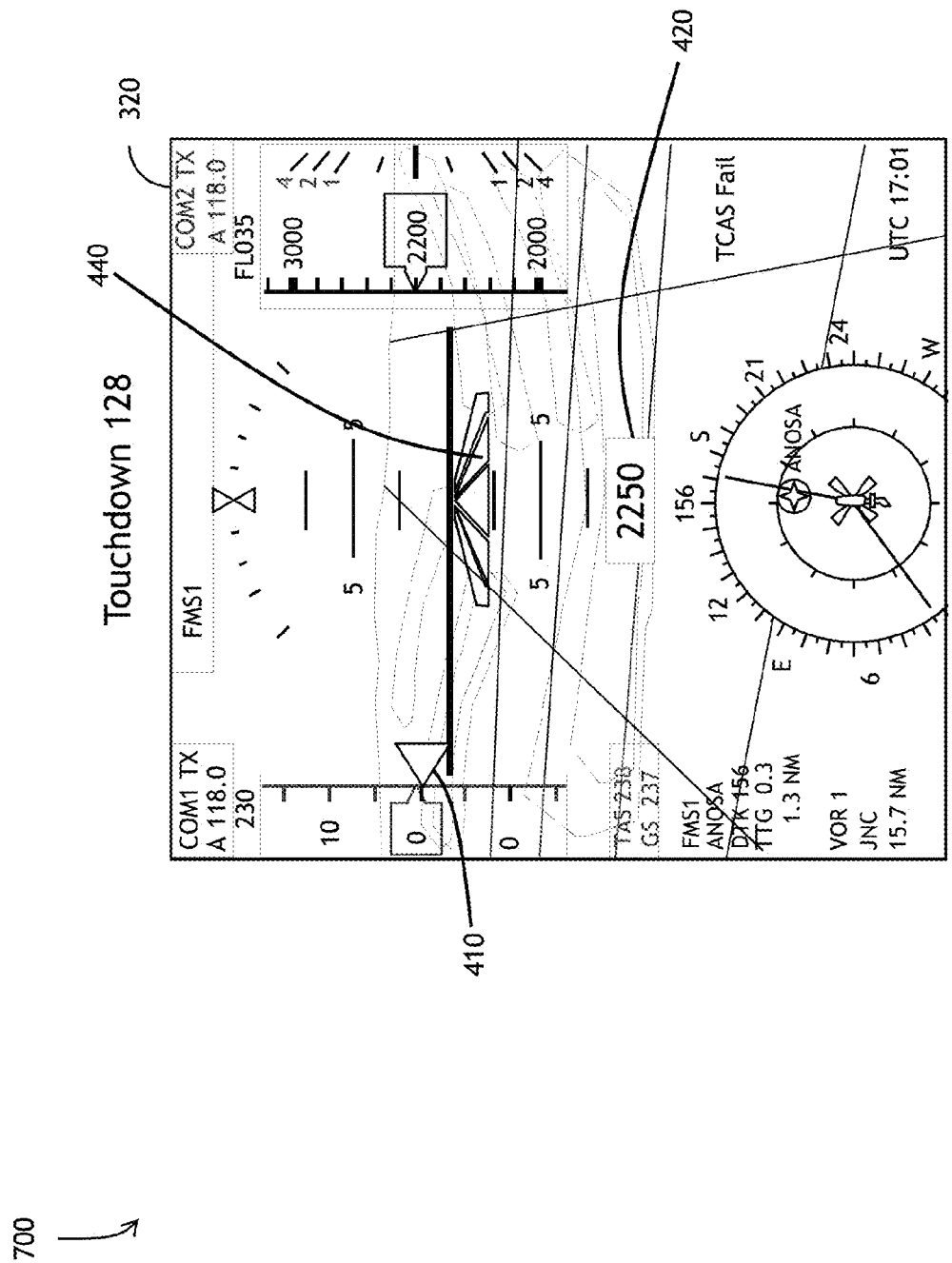
FIG. 7 a diagram of a flight display at a point during autorotation touchdown exemplary of one embodiment of the inventive concepts disclosed herein.

Referring to FIG. 7, a diagram of a flight display 320 at a point during autorotation touchdown 128 exemplary of one embodiment of the inventive concepts disclosed herein is shown. Once the pilot arrests the rate of descent and forward airspeed, the touchdown phase 700 may place the helicopter safely on the terrain level 102. During the touchdown phase 700, the pilot transitions to the touchdown 128 to settle the helicopter to the surface. As the autorotation flare cue 430 may no longer be required, the system 300 may terminate its display. The remaining autorotation airspeed cue 410 and the autorotation attitude cue 440 may still indicate valuable information to the pilot for crosscheck in the pilot scan during touchdown.

It is contemplated herein that the system 300 may operate in night and Instrument Meteorological Conditions (IMC) to offer an additional tool for the pilot of a helicopter to successfully perform the autorotation maneuver. With trust developed in a system, pilots may have no choice in adverse conditions than to fly the system 300 displayed cues to a successful autorotation and landing.

Figure 8:
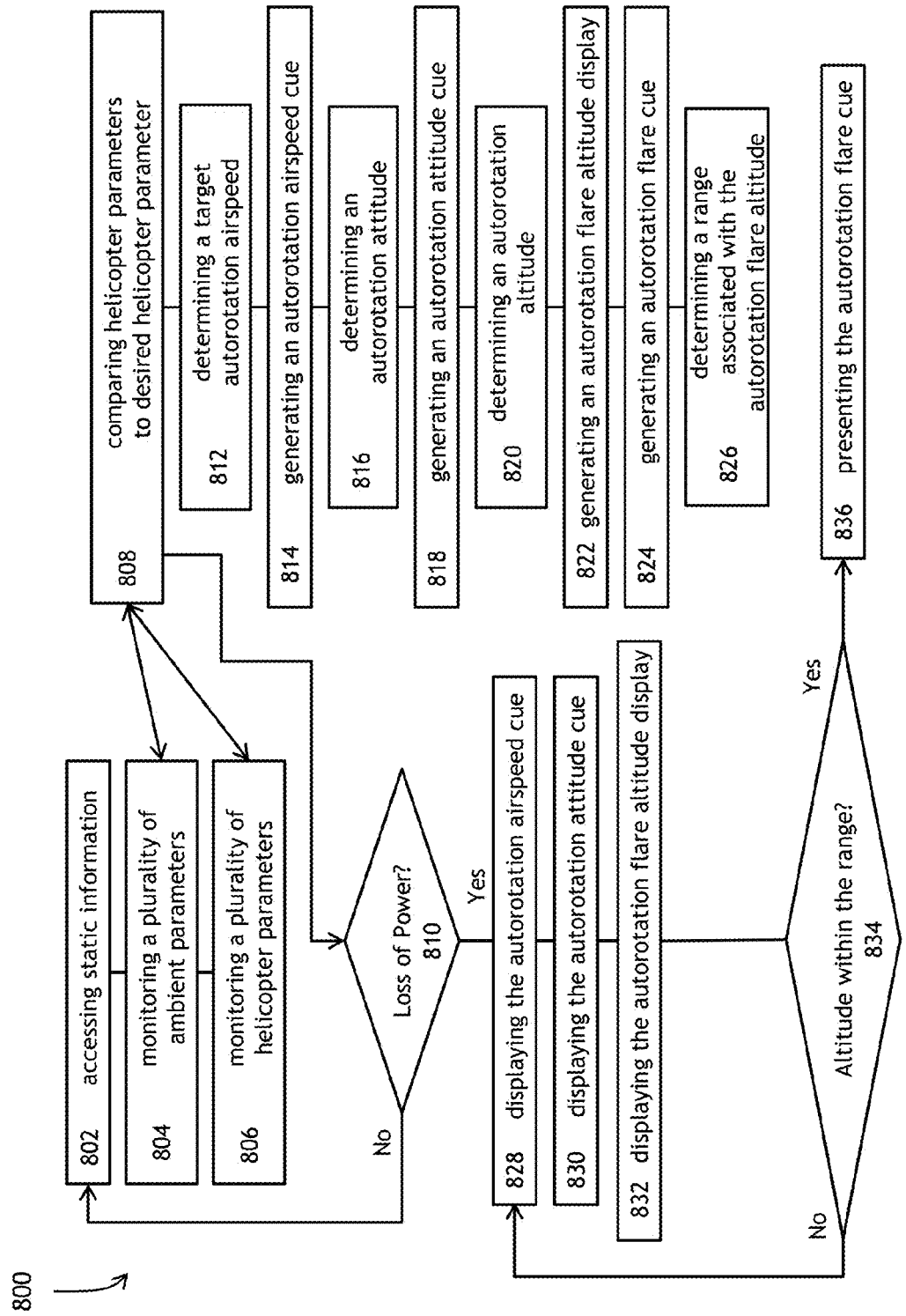
FIG. 8 is a flow diagram for a method for presenting autorotation cues exemplary of one embodiment of the inventive concepts disclosed herein.

Referring to FIG. 8, a flow diagram for a method for presenting autorotation cues exemplary of one embodiment of the inventive concepts disclosed herein is shown. The method 800 may begin at a step 802 with accessing static information, the static information including: terrain data associated with a geographic area; and helicopter specific data associated with a helicopter. The method 800 may continue at a step 804 with monitoring a plurality of ambient parameters and a plurality of helicopter parameters. As a result of the monitoring, the method 800 may, at a step 808, compare at least one of the plurality of helicopter parameters to at least one desired helicopter parameter.

The method 800 may continue at a step 810, with determining a loss of power based on the comparing. Method 800 may determine a plurality of variables associated with the autorotation including at a step 812, a target autorotation speed, at a step 816 an autorotation attitude and, at a step 818, an autorotation altitude.

After variable determination, the method 800 may generate cues associated with the variables including, at a step 814 an autorotation airspeed cue, at a step 818 an autorotation attitude cue, at a step 822 an autorotation flare altitude display, and at a step 824 and autorotation flare cue.

Once the autorotation cues are determined and generated, the method 800 may continuously monitor the plurality of helicopter parameters for a reason to present the autorotation cues to the pilot. Should the monitoring reveal a loss of power, the method 800 may display 1) the autorotation airspeed cue at a step 828, 2) the autorotation attitude cue at a step 830 and 3) the autorotation flare altitude display at a step 832.

Then as the helicopter descends during the autorotation maneuver and is within a predetermined range of the autorotation flare altitude, system may present the autorotation flare cue 836 via the flight display and the audible CAS message.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

Those having skill in the art will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the inventive concepts disclosed herein have been shown and described, it will be apparent to those skilled in the art that, based upon the teachings herein, changes and modifications may be made without departing from the inventive concepts described herein and their broader aspects and, therefore, the appended claims are to encompass within their scope all such changes and modifications as are within the true spirit and scope of the subject matter described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently.

What is claimed is:

1. A system for displaying autorotation cues to a helicopter pilot, comprising:
   a storage device configured for storing at least static information, the static information including:
      terrain data associated with a geographic area; and
      helicopter specific data associated with a helicopter;
   a controller operatively coupled with the storage device, the controller having an autorotation cue processor and an autorotation cue generator;
   the storage device having non-transitory computer readable program code embodied therein for determining autorotation cues, the computer readable program code comprising instructions which, when executed by the autorotation cue processor, cause the autorotation processor to perform and direct the steps of:
      monitoring a plurality of ambient parameters including an above ground level altitude of the helicopter;
      monitoring a plurality of helicopter parameters including at least an engine speed;
      comparing at least one of the plurality of helicopter parameters to at least one desired helicopter parameter;
      determining a loss of power based on the comparing;
      determining a target autorotation airspeed based on the static information and the plurality of ambient parameters;
      determining an autorotation attitude based on the target autorotation airspeed and the helicopter parameters; and
      determining an autorotation flare altitude based on the target autorotation airspeed, the plurality of ambient parameters, and the plurality of helicopter parameters;
   the non-transitory computer readable program code further including instructions which, when executed by the autorotation cue generator, cause the autorotation cue generator perform and direct the steps of:
      generating an autorotation attitude cue based on the autorotation attitude;
      generating an autorotation airspeed cue based on the target autorotation airspeed; and
      generating an autorotation flare cue based on the autorotation altitude, the autorotation flare cue including at least one of: a visual cue and an audible cue;
      generating an autorotation flare altitude display based on the autorotation altitude;
   a flight display operatively coupled with the controller, the flight display device configured for:
      in response to the autorotation cue processor determining a loss of power, displaying, to the helicopter pilot, the autorotation airspeed cue, the autorotation attitude cue, and the autorotation altitude display;
      presenting the autorotation flare cue on the flight display an on an audible warning device when the monitoring indicates an above ground level altitude within a predetermined range of the autorotation altitude.

2. The system of claim 1, wherein the terrain data associated with a geographic area includes one of: a digital terrain database, a raster terrain database, and a vector terrain database.

3. The system of claim 1, wherein the helicopter specific data associated with the helicopter includes at least one of: a helicopter type, autorotation airspeed, an autorotation profile, data associated with a height velocity profile for the helicopter, and an average helicopter weight.

4. The system of claim 1, wherein the plurality of ambient parameters further include at least one of: an ambient wind vector, density altitude, and an ambient temperature.

5. The system of claim 1, wherein the plurality of helicopter parameters further include at least one of: a yaw rate, an attitude, an airspeed, and a heading.

6. The system of claim 1, wherein the at least one desired helicopter parameter includes: an engine torque, a power level of the engine, an engine rounds per minute speed, a current main rotor blade angle, a tail rotor speed, a rudder deflection, and an ability of the engine to drive a helicopter main rotor.

7. The system of claim 1, wherein the autorotation airspeed cue is displayed associated with an airspeed indicator on the flight display onboard the helicopter.

8. The system of claim 1, further including a crew alerting system configured for providing the audible cue.

9. The system of claim 1, wherein the autorotation flare cue is associated with an altitude indicator on the flight display onboard the helicopter.

10. The system of claim 1, wherein the autorotation altitude is centrally displayed on at least one of: the flight display and a heads up display for enhanced helicopter pilot awareness.

11. A method for displaying autorotation cues to a helicopter pilot, comprising:
   accessing static information, the static information including:
      terrain data associated with a geographic area; and
      helicopter specific data associated with a helicopter;
   monitoring a plurality of ambient parameters;
   monitoring a plurality of helicopter parameters;
   comparing at least one of the plurality of helicopter parameters to at least one desired helicopter parameter;
   determining a loss of power based on the comparing;
   determining a target autorotation airspeed based on the static information and the plurality of ambient parameters;

generating an autorotation airspeed cue based on the target autorotation airspeed;

determining an autorotation attitude based on the target autorotation airspeed and at least one of the plurality of helicopter parameters;

generating an autorotation attitude cue based on the autorotation attitude;

determining an autorotation flare altitude based on the target autorotation airspeed, the plurality of ambient parameters, and the plurality of helicopter parameters;

generating an autorotation flare altitude display based on the autorotation flare altitude;

generating an autorotation flare cue based on the autorotation flare altitude, the autorotation flare cue including at least one of: a visual cue and an audible cue;

in response to determining a loss of power, displaying, to a helicopter pilot on a flight display, the autorotation airspeed cue, the autorotation attitude cue and the autorotation flare altitude display;

determining a range associated with the autorotation flare altitude based on at least one of the plurality of ambient parameters;

presenting the autorotation flare cue on the flight display and with an audible warning device when the monitoring indicates an above ground level altitude within the range.

12. The method of claim 11, wherein the static information associated with a geographic area includes storing at least one of: a digital terrain database, a raster terrain database, and a vector terrain database.

13. The method of claim 11, wherein the static information associated with the helicopter further includes at least one of a helicopter type, autorotation airspeed, an autorotation profile, data associated with a height velocity profile for the helicopter, and an average helicopter weight.

14. The method of claim 11, wherein monitoring the plurality of ambient parameters further includes monitoring at least one of: an ambient wind vector, density altitude, and an ambient temperature.

15. The method of claim 11, wherein monitoring the plurality of helicopter parameters further includes monitoring at least one of: a yaw rate, an attitude, an airspeed, and a heading.

16. The method of claim 11, wherein comparing the at least one desired helicopter parameter to at least one desired helicopter parameter further includes comparing at least one of: an engine torque, a power level of the engine, an engine rounds per minute speed, a current main rotor blade angle, a tail rotor speed, a rudder deflection, and an ability of the engine to drive a helicopter main rotor.

17. The method of claim 11, wherein displaying the autorotation airspeed cue further includes displaying the autorotation airspeed cue associated with an airspeed indicator on the flight display onboard the helicopter.

18. The method of claim 11, wherein a crew alerting system is configured for providing the audible cue.

19. The method of claim 11, wherein displaying the autorotation flare cue further includes displaying the autorotation flare cue associated with an altitude indicator on the flight display onboard the helicopter.

20. The method of claim 11, wherein displaying the autorotation flare altitude display further includes a centrally displayed autorotation flare altitude display on at least one of: the flight display and a heads up display for enhanced helicopter pilot awareness.

* * * * *